No. 727,910. PATENTED MAY 12, 1903.
B. V. COVERT.
MOTOR VEHICLE.
APPLICATION FILED APR. 24, 1902.

NO MODEL. 3 SHEETS—SHEET 1.

Witnesses:
R. P. Chamberlain
J. J. Lankes

Byron V. Covert, Inventor.
By Neuhart & Burkhart
Attorneys.

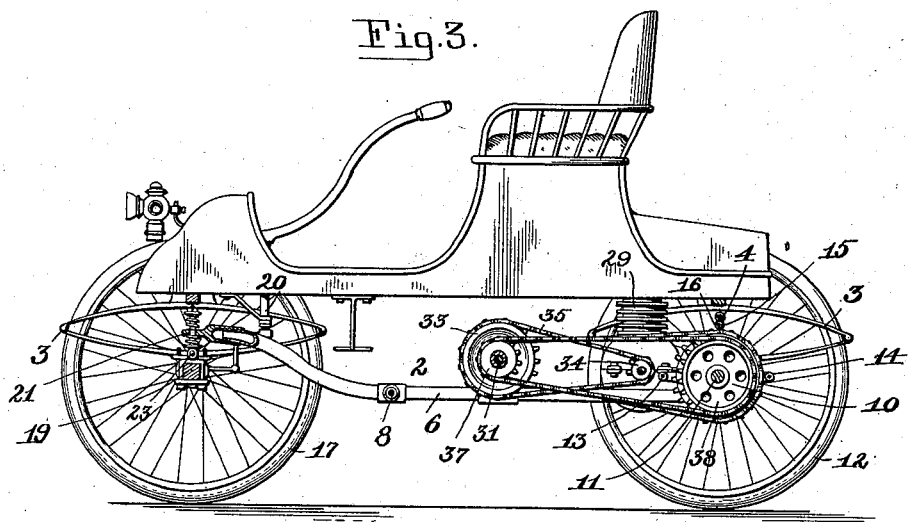
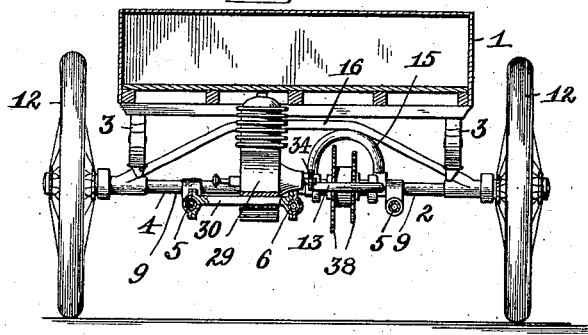
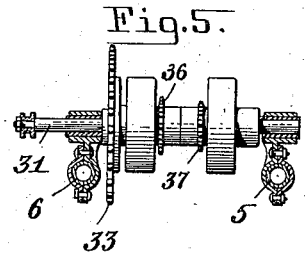
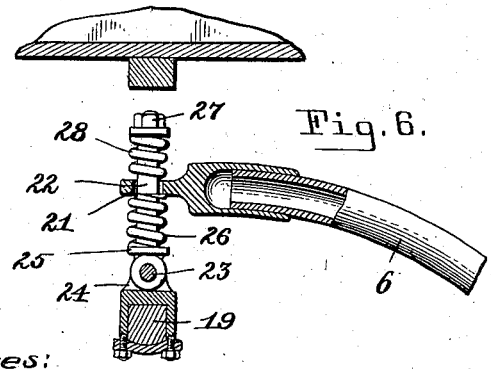

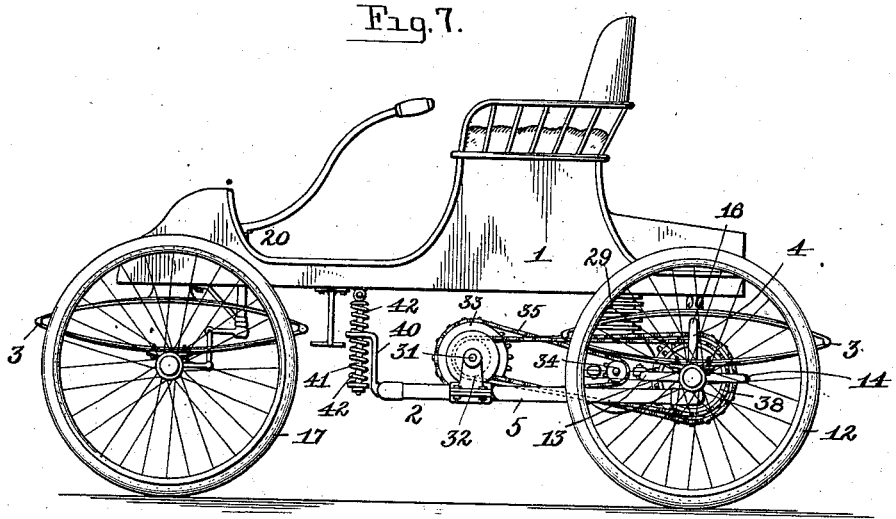

No. 727,910. Patented May 12, 1903.

UNITED STATES PATENT OFFICE.

BYRON V. COVERT, OF LOCKPORT, NEW YORK.

MOTOR-VEHICLE.

SPECIFICATION forming part of Letters Patent No. 727,910, dated May 12, 1903.

Application filed April 24, 1902. Serial No. 104,489. (No model.)

*To all whom it may concern:*

Be it known that I, BYRON V. COVERT, a citizen of the United States, residing at Lockport, in the county of Niagara and State of New York, have invented certain new and useful Improvements in Motor-Vehicles, of which the following is a specification.

This invention relates to motor-vehicles, and more particularly to the running-gear and the manner of supporting the front end of the same.

The object of this invention is to provide means to adjustably mount the motor and the transmission mechanism on the running-gear, so that one may be moved relative to the other or that both may be adjusted relative to the driven axle, whereby the transmission-chains may be tightened or slackened, as may be desirable.

Another object of my invention is to yieldingly support the front end of the frame on the vehicle-body, so that the vibrations of the former caused by the engine and transmission mechanism will not be imparted to the latter, such vibrations being not only unpleasant, but also aid to loosen the connections on the frame, making the same weak and unreliable.

A still further object is to provide a sightly, light, and neat-appearing axle-frame, which will effectively withstand the vertical strain caused by the superposed weight of the occupants, the twisting strain caused by coming suddenly in contact with an obstruction on the road, and the horizontal strains imposed by the transmission mechanism.

Other objects embrace certain improvements in the arrangement and combination of parts, which are fully set forth hereinafter and are particularly pointed out in the appended claims.

Figure 1:
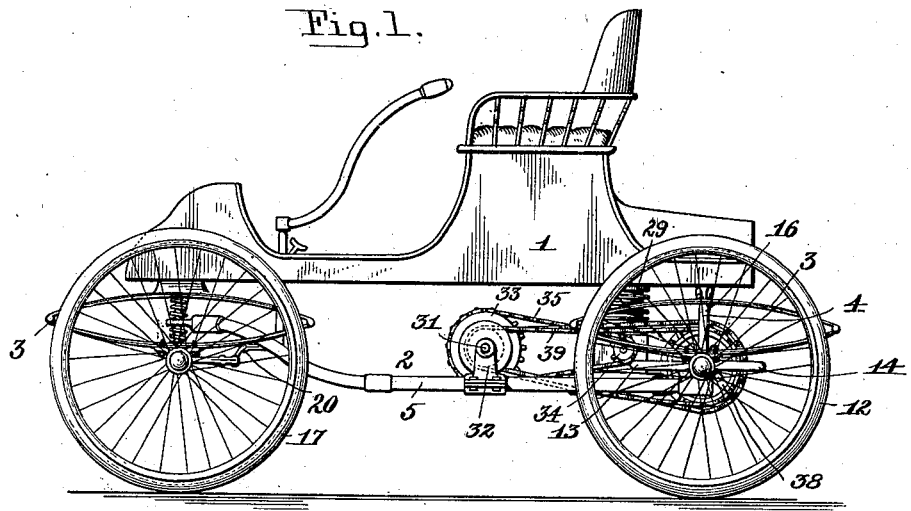
Figure 2:
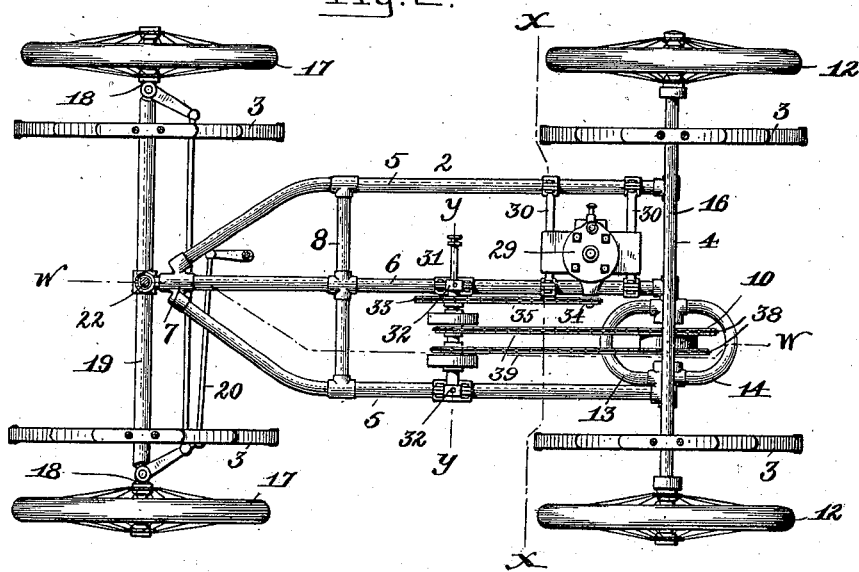

In the accompanying drawings, Figure 1 is a side elevation of a vehicle having my improvements embodied therein. Fig. 2 is a plan view with the vehicle-body removed. Fig. 3 is a vertical longitudinal section taken on line *w w*, Fig. 2, showing the vehicle-body in side elevation. Fig. 4 is a vertical section taken on line *x x*, Fig. 2, looking to the right.
Fig. 5 is a transverse section on line *y y*, Fig. 2, on an enlarged scale. Fig. 6 is a longitudinal section taken on line *z z*, Fig. 2. Fig. 7 is a side elevation of a vehicle with my improvement in a slightly-modified form. Fig.
8 is a plan view of the same with the running-gear removed.

Referring to the drawings in detail, like numerals of reference refer to like parts in the several figures.

The numeral 1 designates the body of the vehicle, which is carried on my improved running-gear 2 by the intervention of the usual elliptical springs 3. The frame of the gear comprises a rear cross or axle member 4, side bars or perches 5, and an intermediate bar 6, arranged midway between and parallel with the side bars. In the preferred form the side bars 5 are made to converge and meet the front end of the intermediate bar, as at 7, at which point they are suitably connected by a forging or in any other approved manner. To rigidly connect the side bars or perches and the intermediate bar, a cross-bar 8 is provided, which is secured to said bars by forgings or castings, as is common in joining the metallic tubes.

The axle member 4 comprises two alined axle-tubes 9, having their inner ends separated sufficiently to provide space for the compensating gear mechanism 10, which is secured to the driven divided axle 11, to which the rear wheels 12 are secured. The adjacent ends of the axle-tubes 9 are connected together by forward and rearward extending horizontal yoke or loop members 13 and 14, respectively, which are brazed or otherwise rigidly secured to the axle-tubes and designed to withstand the severe twisting strain imparted to the axle member when the rear wheels come suddenly in contact with an obstruction in the path of the vehicle and also to withstand the horizontal strain imposed by the transmission mechanism and produced under the resistance of the ground. A vertical loop or yoke member 15 is also rigidly connected to the adjacent ends of the axle-tubes and serves to withstand the vertical strain caused by the superposed weight and to make the axle member liable to the least amount of spring. To further guard against vertical strain and to prevent upward and rearward deflection of the outer ends of the axle-tubes, an arch-bar 16 is arranged above the same and rigidly connected thereto at their outer ends and brazed or otherwise secured to the vertical loop or yoke member 15, thereby forming a most substantial and rigid axle, permitting of a light and sightly construction. In some cases the arch-bar 16 may be dispensed with, as the yoke connection of the inner ends of the axle-tubes will withstand all ordinary strains.

The inner ends of the axle-tubes are additionally braced by the side bars or perches 5 and the intermediate bar 6, which latter, with one of the side bars, is connected to the axle-tubes at a point contiguous to the connection of the horizontal yoke members thereto, and these bars and the cross-bar 8 serve to truss and further strengthen the axle member.

17 designates the steering-wheels, which are mounted on stub-axles 18, pivotally secured to the ends of the front axle 19. These stub-axles are caused to be swung on their pivots to turn corners or round curves by steering mechanism 20, which may be of any suitable construction.

As is well known, vehicle-frames of this type on which the motor is carried are subjected to constant vibrating or "shivering" action when the motor is in motion, and this action, in addition to being a very severe strain on the frame, is also imparted to the vehicle-body, which is not only unpleasant, but very tiresome. To overcome this objection and to lengthen the life of the vehicle-frame, I provide the front end of the same with an eye 21, which receives a bolt 22, pivoted, as at 23, to a clip 24, affixed to the front axle. This bolt is provided with a collar 25 adjacent to its pivotal point, between which and the under side of the eye 21 a spiral spring 26 is interposed. A nut 27 is secured to the free end of the bolt, and interposed between the same and the upper face of the eye 21 is a spiral spring 28. It is therefore intelligible that any vibrations of the frame of the running-gear caused by the motion of the engine or the transmission mechanism will be imparted to and taken up by the springs 26 and 28. All other slight vibrations caused in any other manner will also be taken up in this manner without imparting the same to the body of the vehicle.

As is common in motor-vehicles providing for more than one speed, motion is transmitted from the motor to transmission mechanism and from the latter to the driven axle or to the differential gear, as may be the case. In all such cases provision should be made to take up the slackness of the chains or to slacken the same, as may be necessary. To provide for this, I secure the motor (designated by the numeral 29) adjustable on one of the side bars or perches 5 and the intermediate bar 6. As illustrated, cross-bars 30 are provided on which the motor is supported, and these cross-bars are movably attached to one of the bars 5 and the bar 6 by means of clips or in any other suitable manner. The transmission mechanism, which is provided in all cases where two or more speeds are desired, is adjustably secured to the intermediate bar 6 and the other side bar or perch 5. This transmission mechanism forms no part of this invention and may be of any suitable construction, but, as shown, consists of a shaft 31, mounted in bearings 32, adjustable on the said side bar or perch 5 and the intermediate bar 6. This shaft has mounted thereon a sprocket-wheel 33, around which and the sprocket-wheel 34, secured to the motor-shaft, a transmission-chain 35 passes.

36 and 37 designate sprocket-wheels secured to the shaft 31 and, as is common in transmission mechanism, either may be made to revolve with the shaft. Sprocket-wheels 38 are secured to the driven axle and, as shown, may be combined with the differential-gear mechanism. Transmission-chains 39 serve to transmit motion from the transmission mechanism to the driven shaft. By means of this arrangement the motor and transmission may be adjusted relative to one another and either or both relative to the driven axle, whereby the transmission-chain between the motor and the transmission mechanism may be slackened or tightened without affecting the condition of any of the other transmission-chains and whereby all the chains may be adjusted with ease and convenience.

In Figs. 7 and 8 a slightly-modified form of my invention is shown. In this instance the frame terminates at the point where the cross-bar 8 is connected to the intermediate bar 6 and side bars or perches 5. The front end of the frame has affixed thereto in any suitable manner a hanger 40, through which a bolt 41 passes, which is pivoted to the bottom of the vehicle-body. This bolt is similar in all respects to the bolt 22, and in conjunction with the springs 42, surrounding the same and acting thereon, and with the vehicle-frame, in like manner to the springs 26 and 28, hereinbefore described, they serve also to take up the vibrations of the frame without imparting the same to the vehicle-body.

It is to be understood that this invention is susceptible to various changes in the arrangement of parts, in form, and in the details of construction without departing from the principle or sacrificing any of the advantages thereof.

Having fully described my invention, what I claim is—

1. In a motor-vehicle, the combination with the motor, of transmission mechanism, and a driving-axle driven from the transmission mechanism and designed to drive the vehicle, said motor and transmission mechanism being adjustable, one relative to the other, and both being adjustable relative to the said driving-axle, substantially as and for the purpose set forth.

2. The combination with the frame having two side bars or perches and an intermediate bar, of a motor adjustably supported on one of said side bars or perches and the intermediate bar, transmission mechanism driven by said motor and being adjustably supported on the other side bar or perch and the said intermediate bar, and a driving-axle driven by the said transmission mechanism and serving to propel the vehicle, thus permitting the motor and transmission mechanism to be adjusted one relative to the other, and both relative to the said driving-axle, substantially as and for the purpose set forth.

3. The combination with the frame comprising two side bars or perches, a parallel intermediate bar, a cross-bar connecting the three, and an axle-tube also connected to the rear ends of the side and intermediate bars, a driving-axle journaled in the axle-tube, a motor adjustably supported on one of the side bars and the intermediate bar, transmission mechanism adjustably supported on the other side bar and the intermediate bar, and flexible driving mechanism between the motor and transmission mechanism and between the latter and the driving-axle, all arranged to permit the motor and transmission mechanism to be adjusted one relative to the other, and both relative to the driving-axle to tighten or slacken the said flexible driving mechanism, as may be desired, substantially as set forth.

4. A running-gear frame comprising two alined axle-tubes having their inner ends connected together by oppositely-disposed horizontal loop or yoke members, a vertical loop also connecting the inner ends of the axle-tubes, longitudinal bars connected to the axle-tubes adjacent to the point of connection with the loop or yoke members, and a cross-bar connecting said longitudinal bars at a point in advance of the axle-tubes, substantially as set forth.

5. In a vehicle, the combination with the vehicle-body, of a running-gear frame comprising a rear-axle structure, a longitudinal structure connected to the rear-axle structure, and an independent front axle, a pivotally-supported bolt passing through the front end of the longitudinal structure and having a collar near its pivotal point, a spiral spring between said collar and the said structure, a nut secured to the free end of said bolt, and a spiral spring interposed between said nut and the longitudinal structure, substantially as set forth.

6. In a motor-vehicle, the combination with the vehicle-body, of a running-gear frame comprising a rear-axle or cross structure, a longitudinal structure rigidly secured to said cross structure and having an eye at its front end, and an independent front axle, spring connections between the vehicle-body and the cross structure and front axle, a bolt having a collar and being pivotally affixed to the front axle and arranged to pass through said eye in the longitudinal structure, a spiral spring interposed between said collar and the longitudinal structure, a nut secured to the free end of the said bolt, and a spiral spring interposed between said nut and the said longitudinal structure, substantially as set forth.

7. In a vehicle, the combination with the vehicle-body, of a running-gear frame comprising a rear-axle structure, a longitudinal structure connected to the rear-axle structure and an independent front axle, a pivotally-supported bolt, and springs surrounding said bolt and bearing against opposite sides of the front end of said longitudinal structure, substantially as set forth.

In witness whereof I have affixed my signature in the presence of two subscribing witnesses.

BYRON V. COVERT.

Witnesses:
M. SERVERT,
R. P. CHAMBERLAIN.